United States Patent [19]

Abel et al.

[11] 4,411,499
[45] Oct. 25, 1983

[54] COMPACT OPTICAL SYSTEM

[75] Inventors: Irving R. Abel, Lexington; Marcus R. Hatch, Arlington, both of Mass.

[73] Assignee: Honeywell Inc., Minneapolis, Minn.

[21] Appl. No.: 204,968

[22] Filed: Nov. 7, 1980

[51] Int. Cl.³ ............................................. G02B 17/08
[52] U.S. Cl. .................................. 350/442; 350/412; 350/443; 350/445
[58] Field of Search ............... 350/442, 443, 444, 445, 350/412

[56] References Cited

U.S. PATENT DOCUMENTS

| | | |
|---|---|---|
| 2,726,574 | 12/1955 | Mandler . |
| 2,730,013 | 1/1956 | Mandler . |
| 2,817,270 | 12/1957 | Mandler . |
| 3,049,054 | 8/1962 | Waland . |
| 3,064,526 | 11/1962 | Lindsay . |
| 3,296,443 | 1/1967 | Argyle . |
| 3,494,688 | 2/1970 | Rosin et al. . |
| 3,515,461 | 6/1970 | Casas et al. . |
| 3,524,698 | 12/1967 | Brueggemann ............ 350/443 |
| 3,527,526 | 9/1970 | Silvertooth . |
| 3,632,190 | 1/1972 | Shimizu . |
| 3,711,184 | 1/1973 | Amon et al. . |
| 3,858,046 | 12/1974 | Cubalchini . |
| 4,061,420 | 12/1977 | Kaprelian et al. . |

| | | |
|---|---|---|
| 4,342,503 | 8/1982 | Shafer . |

FOREIGN PATENT DOCUMENTS

| | | |
|---|---|---|
| 2355305 | 6/1976 | France . |
| 2030315 | 8/1979 | United Kingdom . |

OTHER PUBLICATIONS

Philip J. Rogers, Chief Optical Engr., "A Comparison Between Optimised Spheric and Aspheric Optical Systems for the Thermal Infrared", *SPIE Computer–Aided Optical Design*, vol. 147, pp. 141-148, (1978).

*Primary Examiner*—John K. Corbin
*Assistant Examiner*—P. M. Dzierzynski
*Attorney, Agent, or Firm*—John P. Sumner

[57] ABSTRACT

An improved, compact optical system comprising a concave primary mirror and a convex secondary mirror. The primary mirror converges radiation to the secondary mirror. The secondary mirror comprises a lens having a first and a second surface. The second surface is coated with reflective material. The radiation received by the lens is refracted at the first surface, reflected back from the second surface, and then refracted once again by the first surface. The first and second surfaces have a shape for providing control of field curvature.

14 Claims, 1 Drawing Figure

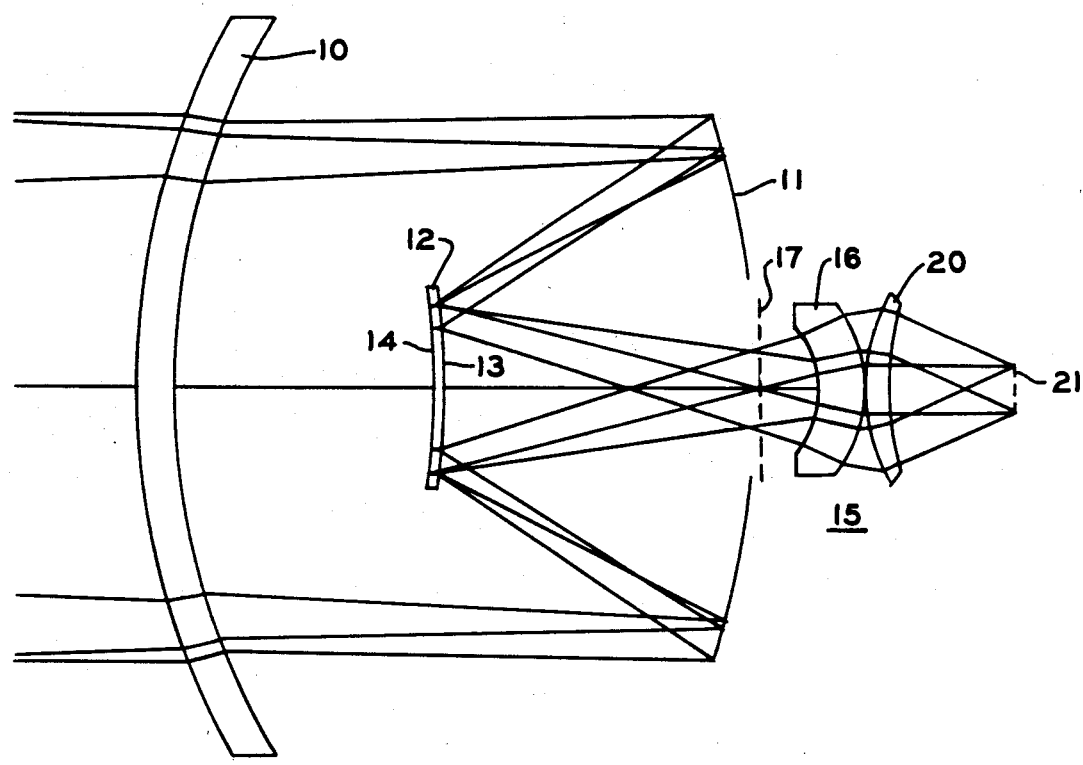

COMPACT OPTICAL SYSTEM

CROSS REFERENCE TO RELATED APPLICATIONS

Reference should be made to our copending applications entitled "Field Curvature Control" and "Optical System Having A Dual Field of View" which are filed on even date herewith and which are assigned to the same assignee as the present application.

BACKGROUND OF THE INVENTION

It is particularly important in gimbal-mounted infrared sensor systems typical of, for example, missile born sensors that the system be extremely compact. In addition, it is important in such infrared systems to avoid field flatteners or separate lenses placed near the image for controlling field curvature; the infrared detector sees itself in any such lens and causes a cold spot in the system output because the detector area is cold. In addition, it is important that the system have a weight distribution providing a relatively small moment of inertia to minimize power requirements for rotating the system by the gimbals.

These requirements have been found to be particularly well satisfied by a concave primary mirror and a convex secondary mirror comprising a configuration often referred to as a cassegrainian arrangement. (The precise definition of a Cassegrain system is one where the primary mirror is specifically a parabola and the secondary mirror a hyperbola. However, systems comprising a concave primary mirror and a convex secondary mirror are now often referred to as cassegrainian systems without particular reference to the particular geometry of the mirors.) Two-mirror arrangements of this kind offer the maximum ratio of focal length to system length.

The compactness of such a configuration is improved as the primary mirror focal length is shortened requiring, as a consequence, a related decrease in the focal length of the secondary mirror. As this design feature is extended, such a system normally shows an increasing amount of field curvature arising from the disparity in the magnitude of radii of the primary and secondary mirrors.

In prior art systems, control of field curvature has typically been handled through use of field flatteners or additional lenses located within the system. See for example, U.S. Pat. No. 3,515,461, Casas et al, June 2, 1970, column 2, lines 44–46. As previously mentioned, if such a field flattener or corrector is located near the image in an infrared system, it has a distinct disadvantage since the detector can see itself as a reflection in the correcting lens. In addition, systems having such additional lenses are heavier and more complex.

In systems where these factors are a problem, a particular feature of the present invention is the use of a mangin mirror having its surfaces shaped for providing control of field curvature without the use of special additional lenses.

Mangin mirrors have classically been used with spherical mirrors to correct spherical aberrations. See, for example, the indicated disclosures within the following U.S. Pat. Nos.:

2,730,013, Mandler, Jan. 10, 1956, Col. 1, lines 19 and 46.

2,817,270, Mandler, Dec. 24, 1957, Col. 1, lines 51–56 and 60–61.

3,064,526, Lindsay, Nov. 20, 1962, Col. 5, lines 20–23 and 66–67.

3,296,443, Argyle, Jan. 3, 1967, Col. 2, lines 33–36.

3,632,190, Shimizu, Jan. 4, 1972, Col. 2, lines 34–39.

See also Rogers, "A Comparison Between Optimized Spheric and Aspheric Optical Systems for the Thermal Infrared", SPIE Vol. 147, Computer-Aided Optical Design, 1978, pp. 141–148 (text at bottom of paper 145).

(In addition, see U.S. Pat. No. 3,527,526, Silvertooth, Sept. 8, 1970, Col. 4, lines 64–67 which discloses use of a mangin in a cassegrainian arrangement for unspecified reasons).

While some of the above patents indicate use of a mangin mirror for correcting other aberrations, it is believed unique to configure mangin mirror surfaces for providing control of field curvature. As previously indicated, the field curvature problem becomes more severe as the optical system is made more compact. However, inasmuch as a mangin mirror may also be defined as a lens having its back surface coated with reflective material, it can be uniquely applied to correct the amount of field curvature by controlling the particular shape or radii of mangin mirror surfaces. Thus, for any given objective system or subsystem, the particular field curvature correction may be established by a unique set of values for the two radii of the mangin mirror surfaces. Further, this can be accomplished as an integral part of one of the two mirrors in a two mirror system and, therefore, does not require supplementing such systems with additional corrector lenses.

SUMMARY OF THE INVENTION

The present invention is an improved, compact optical system. The invention comprises a concave primary mirror and a convex secondary mirror. The primary mirror converges radiation to the secondary mirror. The secondary mirror comprises a lens having a first and a second surface. The second surface is coated with reflective material. The radiation received by the lens is refracted at the first surface, reflected back from the second surface, and then refracted once again by the first surface. The first and second surfaces have a shape for providing control of field curvature.

BRIEF DESCRIPTION OF THE DRAWING

The single FIGURE illustrates a preferred embodiment of the present invention.

DESRIPTION OF THE PREFERRED EMBODIMENT

Reference is made to the accompanying Figure which illustrates a compact optical system in a cassegrainian arrangement. Collimated radiation from a point in the scene is transmitted through a concentric dome window 10 with appropriate refractions at each surface. The beam is slightly divergent as it impinges upon a concave primary front surface mirror 11. It is then converged to a mangin secondary mirror 12 at which the radiation is refracted at a first surface of incidence 13, reflected from a back surface 14, and then refracted once again by the first surface.

As previously indicated, a particular feature of the present invention is providing surfaces 13 and 14 with a shape for controlling field curvature. Mangin secondary mirror 12 also reduces convergence of the beam while reflecting it backward, the radiation being focused at field stop 17. The radiation may then be transmitted through collimator 15 comprising lenses 16 and 20 having appropriate refractions at each surface. Lenses 16 and 20 collimate the radiation and direct it through exit pupil 21.

In the embodiment disclosed, mangin secondary mirror 12 only partially corrects field curvature, the field curvature being completely corrected following collimator 15 (lenses 16 and 20). However, in alternate embodiments, surfaces 13 and 14 of mirror 12 may be shaped to completely correct field curvature at field stop 17. Thus, mangin secondary mirror 12 may be employed to contribute whatever degree of field curvature is necessary to flatten the field or to control the field curvature to the desired flatness.

The field curvature contribution of mangin secondary mirror 12 is $1/R$ and may be defined by a equation $1/R = 2[(n-1)/r_1 + 1/r_2]/n$. In this equation, R is the radius of the field curvature, n is the index of refraction of the mangin mirror lens, $r_1$ is the radius of the first surface (surface 13 in the disclosed embodiment), and $r_2$ is the radius of the second or back surface (surface 14 in the disclosed embodiment). Thus, once the material for the mangin mirror lens is selected, n is known from available references, and the radii of surfaces 13 and 14 can be calculated to provide any desired degree of field curvature control.

The first and second surfaces of mangin mirror 12 also allows one to select any combination of focusing power and field curvature contribution. For the normal situation in which the mangin mirror is thin, power of the mangin mirror is $1/f$ and may be defined by the equation $1/f = 2[n/r_2 - (n-1)/r_1]$. In this equation, f is the focal length of the mangin mirror, n is the index of refraction of the mangin mirror lens, $r_1$ is the radius of the first surface (surface 13 in the disclosed embodiment), and $r_2$ is the radius of the second or rear surface (surface 14 in the disclosed embodiment).

Tables 1 and 2 set forth below give the dimensions and parameters of one preferred embodiment of the present invention.

TABLE 1
SPECIFICATION-SYSTEM EXAMPLE

| Element | Radius (inches) | Thickness (inches) | Material | Conic Constant |
|---|---|---|---|---|
| Dome 10 | 6.0 | .30 | Zinc Sulfide | |
| | 5.7 | 4.8 | | |
| Primary Mirror 11 | −7.166 | −2.555 | Aluminum | −.75102 |
| Secondary Mirror 12 | −6.758 | −.10 | Germanium | |
| | −5.475* | .10 | | −4.7 |
| Field Stop 17 | | 2.555 | | |
| | | .501 | | |
| Collimator Lens 16 | −.818 | .401 | Germanium | |
| | −1.047 | .01 | | |
| Collimator Lens 20 | 1.544 | .20 | Germanium | −.3565 |
| | 2.340 | 1.04 | | |
| Pupil 21 | | | | |

*Surface is Aspheric:

$$\text{Sag} = \frac{\frac{y^2}{r}}{1 + \sqrt{1 - (K+1)\frac{y^2}{r^2}}} + dy^4 + ey^6 + fy^8 \text{ where}$$

$d = 2.213 \times 10^{-3}$
$e = -1.459 \times 10^{-3}$
$f = 4.591 \times 10^{-4}$
y = aperture height
r = radius of the surface
k = conic constant

TABLE 2

| EXAMPLE SYSTEM PARAMETERS | |
|---|---|
| Telescope Magnification | 11.9 |
| External Field of View | 2.38° × 3.22° |
| Entrance Pupil Diameter | 4.4 in. |
| Objective F-Number | 2.0 |
| Objective Focal Length | 8.85 in. |
| Collimator Focal Length | .744 in. |

Table 1 is laid out in a manner common in the art; if more than one dimension is given for an element, the dimensions appear in the order that light travels from the scene through the system. For example, for dome 10, the first radius listed of 6.0 inches corresponds to the first surface of dome 10, and the radius of 5.7 inches corresponds to the second surface of dome 10.

In the thickness column of Table 1, the numbers include on-axis air space thicknesses listed in the order in which light travels through the system. Accordingly, the first number of 0.30 inch is the thickness of dome 10. The second number of 4.8 inches corresponds to the on-axis distance between the second surface of dome 10 and a point that would intersect the radius of the reflective front surface of primary mirror 11. The minus sign associated with the first dimension of 2.555 inches indicates light traveling in a backward direction. The 0.10 inch number listed in association with mangin secondary mirror 12 indicates the thickness of the mirror, the first number being negative since light is traveling in the reverse direction in its first transit to the reflective back surface 14 of that mirror. The positive 2.555 inch dimension is the air space distance between first surface 13 of mirror 12 and field stop 17, which is the first focal plane. The dimension of 0.501 inch is the distance between field stop 17 and the first surface of lens 16 within collimator 15. The 0.401 inch dimension listed in association with collimator lens 16 is the thickness of that lens, the 0.01 inch dimension being the air space thickness between the second surface of lens 16 and the first surface of lens 20. The 0.20 inch dimension listed in association with lens 20 is the thickness of that lens, the 1.04 inch dimension being the distance between the second surface of lens 20 and exit pupil 21.

It should be noted, of course, that the dimensions and parameters listed in Tables 1 and 2 do not represent the present invention, but rather a particular application of it.

It should also be noted that, while the mangin mirror has been shown as a secondary mirror in the disclosed embodiment, the secondary mirror could be a front surface mirror, and the primary mirror could be a mangin mirror with first and second surfaces shaped for providing control of field curvature. Alternately, both mirrors could be mangin mirrors with one or both having surfaces so shaped.

Further, although mirrors 11 and 12 are both disclosed as aspheric (see Table 1), either or both of these mirrors can be spherical.

In addition, while primary mirror 11 is disclosed as having an aperture for transmission of radiation reflected from secondary mirror 12, the system could be configured without the aperture and with secondary mirror 12 reflecting radiation past the edge of primary mirror 11.

Compactness of a cassegrainian system can be quantized by a ratio of the system physical length divided by the system focal length. For the embodiment disclosed in Tables 1 and 2, that ratio is 0.30 which is obtained by dividing 2.655 inches (0.10 inch plus 2.555 inches) by 8.85 inches; in this calculation, 0.10 inch is the thickness of mangin secondary mirror 12, 2.555 inches is the air space distance between the first surface of mirror 12 and field stop 17 (the first image), and 8.85 inches is the objective focal length.

The present invention is to be limited only in accordance with the scope of the appended claims, since persons skilled in the art may devise other embodiments still within the limits of the claims.

The embodiments of the invention in which an exclusive property or right is claimed are defined as follows:

1. An improved, compact optical system comprising:
 a concave primary mirror;
 a convex secondary mirror;
 the primary mirror converging radiation to the secondary mirror;
 the secondary mirror comprising a lens having a first and a second surface, the second surface being coated with reflective material, the radiation received from the primary mirror being refracted at the first surface, reflected back from the second surface, and then refracted once again by the first surface, the first and second surfaces having a shape for providing control of field curvature; and
 wherein system compactness is measured by the ratio (system physical length)/(system focal length) and wherein the ratio is less than 0.38, the systeem physical length being defined as the distance from the secondary mirror to the focal plane whenever the focal plane is at or behind the primary mirror and as the distance between the primary and secondary mirrors whenever the focal plane is located between the primary and secondary mirrors.

2. The apparatus of claim 1 wherein at least one of the primary mirror and the secondary mirror is aspheric.

3. The apparatus of claim 2 wherein both the primary mirror and the secondary mirror are aspheric.

4. The apparatus of claim 2 wherein the primary mirror has an aperture for transmission of radiation reflected from the secondary mirror.

5. The apparatus of claim 1 wherein the primary mirror has an aperture for transmission of radiation reflected from the secondary mirror.

6. An improved, compact optical system comprising:
 a concave primary mirror;
 a convex secondary mirror;
 the primary mirror converging radiation to the secondary mirror;
 the secondary mirror comprising a lens having a first and a second surface, the second surface being coated with reflective material, the radiation received from the primary mirror being refracted back at the first surface, refracted from the second surface, and then refracted once again by the first surface, the first and second surfaces each having radii which determine the field curvature by the equation $1/R = 2[(n-1)/r_1 + 1/r_2]/n$ where R is the radius of the field curvature, n is the index of refraction of the lens, r1 is the radius of the second surface; and
 wherein system compactness is measured by the ratio (system physical length)/(system focal length) and wherein the ratio is less than 0.38, the system physical length being defined as the distance from the secondary mirror to the focal plane whenever the focal plane is at or behind the primary mirror and as the distance between the primary and secondary mirrors whenever the focal plane is located between the primary and secondary mirrors.

7. The apparatus of claim 6 wherein the power of the secondary mirror is 1/f and is defined by the equation $1/f = 2[n/r_2 - (n-1)r_1]$ wherein f is the focal length of the secondary mirror, n is the index of refraction of the lens, $r_1$ is the radius of the first surface, and $r_2$ is the radius of the second surface, whereby the radii of the first and second and surfaces can be selected to provide any combination of focusing power and field curvature.

8. The apparatus of claim 7 wherein at least one of the primary mirror and the secondary mirror is aspheric.

9. The apparatus of claim 8 wherein both the primary mirror and the secondary mirror are aspheric.

10. The apparatus of claim 8 wherein the primary mirror has an aperture for transmission of radiation reflected from the secondary mirror.

11. The apparatus of claim 6 wherein at least one of the primary mirror and the secondary mirror is aspheric.

12. The apparatus of claim 11 wherein both the primary mirror and the secondary mirror are aspheric.

13. The apparatus of claim 11 wherein the primary mirror has an aperture for transmission of radiation reflected from the secondary mirror.

14. The apparatus of claim 6 wherein the primary mirror has an aperture for transmission of radiation reflected from the secondary mirror.

* * * * *